United States Patent [19]
Craig

[11] 3,748,785
[45] July 31, 1973

[54] TWO-WAY PRESSURE HATCH AND LATCHING MEANS THEREFOR

[75] Inventor: Fred A. Craig, San Jose, Calif.

[73] Assignee: FMC Corporation, San Jose, Calif.

[22] Filed: Nov. 17, 1971

[21] Appl. No.: 199,601

[52] U.S. Cl. ............................. 49/394, 292/256.69
[51] Int. Cl. ............................................ E05b 65/06
[58] Field of Search .................. 49/394; 292/256.69

[56] References Cited
UNITED STATES PATENTS
2,352,192  6/1944  Gasche ........................... 292/256.69
2,721,094  10/1955  Webster ......................... 292/256.69

FOREIGN PATENTS OR APPLICATIONS
367,285  2/1932  Great Britain ................. 292/256.69

Primary Examiner—Kenneth Downey
Attorney—F. W. Anderson et al.

[57] ABSTRACT

A hatch for a diving bell or the like which is able to withstand both internal and external pressures is comprised of a curved body portion having an annular lip adapted to seal against the flat upper surface of the coaming which forms the hatchway. The hatch is latched by means of an expandable split ring which is adapted to be received in its expanded condition under an annular lip on the coaming. The ring is expanded by means of a toggle joint connection at the adjacent opposed ends of the ring which toggle joint is arranged to be pivoted into a locked overcenter position by a rotatable pin that may be rotated by handles located at both sides of the hatch.

8 Claims, 5 Drawing Figures

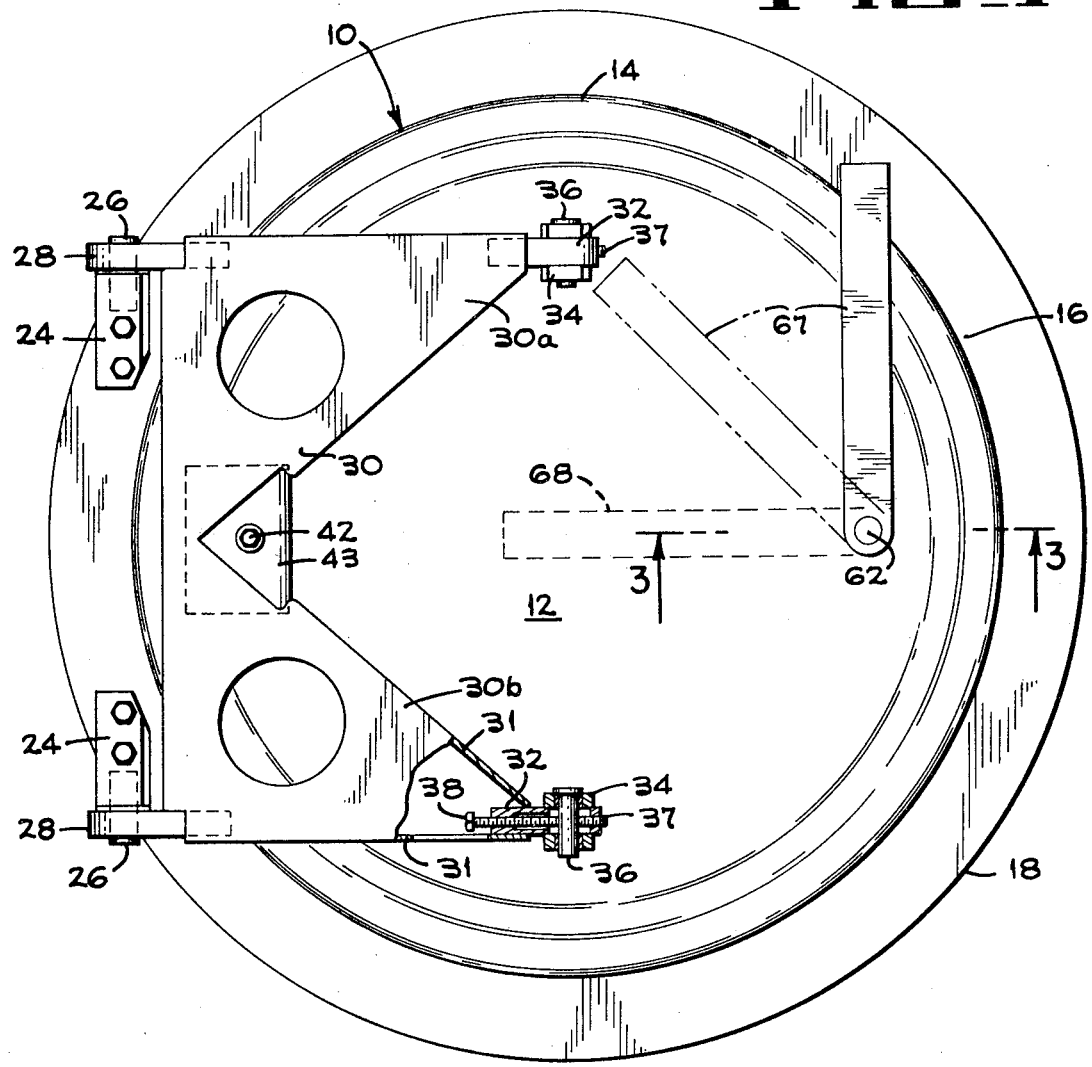
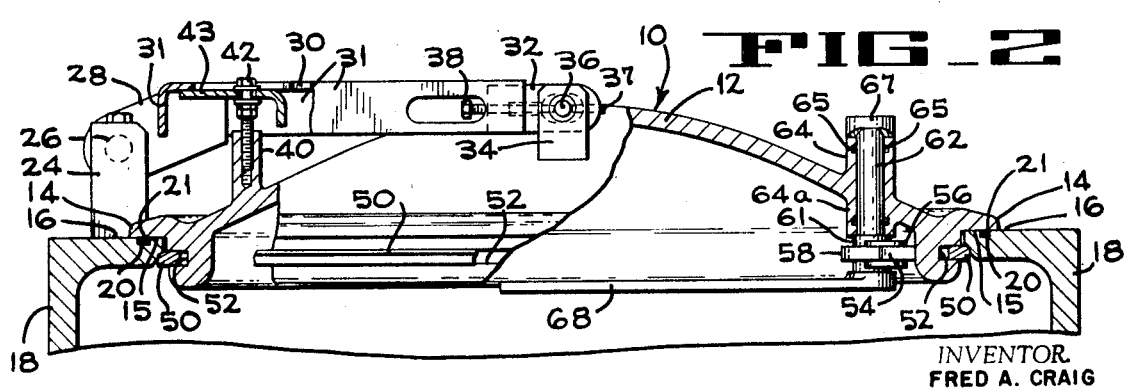

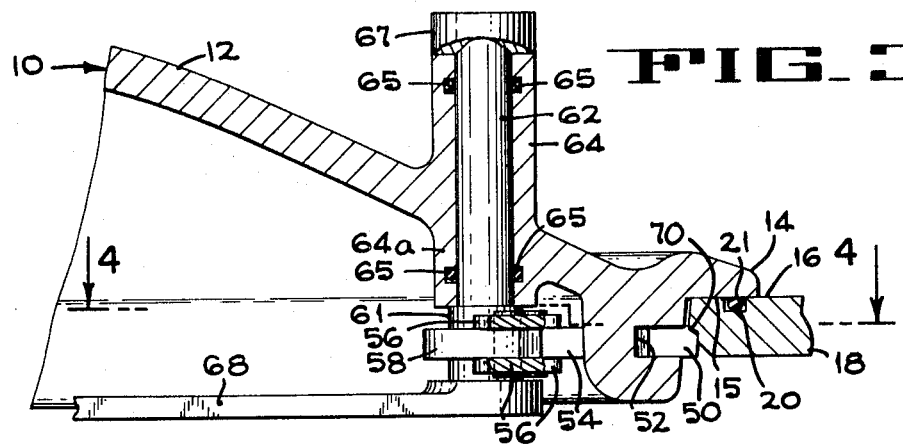
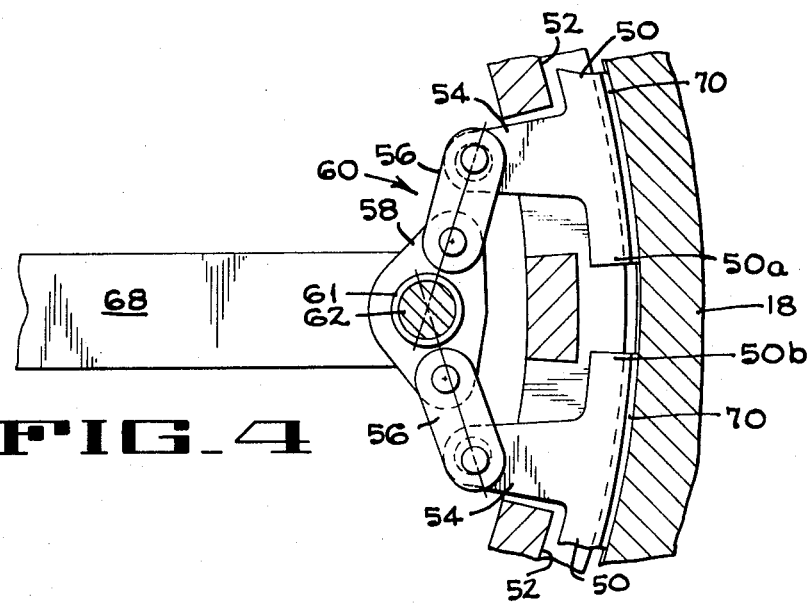
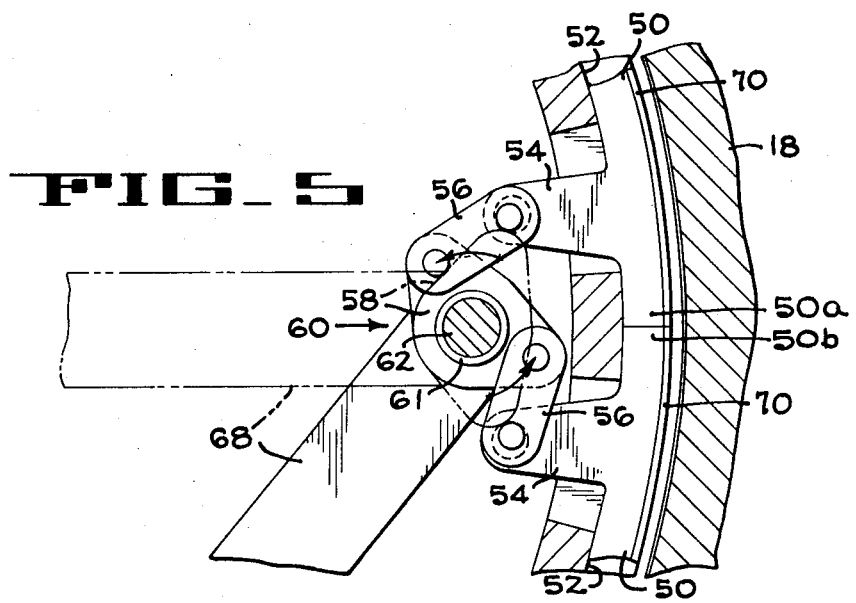

TWO-WAY PRESSURE HATCH AND LATCHING MEANS THEREFOR

BACKGROUND OF THE INVENTION

1. Field of the Invention

The present invention pertains to hatches or pressure doors for use on submergible vessels or the like which must be able to withstand both internal and external pressures of considerable magnitude, and more particularly, it pertains to the latching means for such a hatch.

2. Description of the Prior Art

In submergible vessels, such as diving bells, the hatches or escape doors must be built so that they will be able to withstand both external pressures and internal pressures of substantial magnitude. One obvious solution to the problem of providing a hatch capable of withstanding two-way pressure is to form a double hatch with each individual hatch comprising a conventional one-way pressure resisting sealed door. However, such a solution has some obvious drawbacks. The most serious disadvantage of the aforedescribed double-hatch system is the fact that almost twice the weight is required by a double-hatch system than would be required by a single two-way pressure hatch, and it is normally desired to reduce the weight to a minimum both from an economic standpoint and an operational standpoint. Not only is the weight of the hatch structures practically doubled with a double-hatch system, but also the coaming, or other hatchway structure to which the hatch is sealed, must obviously be considerably bulkier and of greater weight in the double-hatch system. Finally, it should be noted that a single two-way hatch reduces the time of egress or ingress because of the reduced time required for opening and closing one hatch as compared to the time required to open and close two hatches. This last factor can become extremely important where safety is a prime consideration.

One advantage of the double-hatch system over the single two-way hatch, however, is the fact that more mechanism, usually of a complex nature, is required for latching a single two-way hatch thereby creating a greater chance for malfunction and possible failure of the hatch so as to prevent egress or ingress. In a double hatch each hatch is designed in a straightforward conventional manner so that the acting pressure always tends to seal the hatch while in the two-way pressure hatch the attempt to seal and latch in two opposite directions creates a number of problems which have not been altogether satisfactorily solved by the prior art.

In one type of prior art two-way pressure hatch, the hatch, or door, is provided with a plurality of pivotable dogs located at uniformly spaced positions about the periphery thereof. The dogs are positioned adjacent to an annular slot in the coaming and are arranged to be pivoted into the slot to latch the hatch simultaneously at a plurality of positions about its periphery. The dogs may be actuated by a ring member mounted on the hatch which ring member is rotatable so as to simultaneously cam all of the dogs into the coaming slot. While this structure provides an acceptable sealing and latching arrangement, the use of a plurality of dogs and their supporting structure on the hatch adds considerably to the cost and also to the weight of the hatch.

An alternative prior art method of constructing a two-way pressure hatch is to provide a rotatable coaming ring having a plurality of lugs which, upon rotation of the ring, are arranged to engage and be latched with a plurality of similar lugs spaced circumferentially about the periphery of the hatch. This hatch structure has basically the same problems as the aforementioned two-way pressure hatch structure in that it is relatively complex and expensive to build particularly in that the coaming ring must be provided with carefully fitted guides and bearings, etc. Because of the relatively complex structure of the coaming it is heavy and adds considerable weight and cost to the overall hatchway structure.

Another prior art two-way pressure hatch is shown in the U. S. Pat. to Pechacek No. 3,435,794. The structure disclosed in this patent utilizes a hatch having a series of shoes spaced about the periphery thereof which are arranged to engage an annular slot in the coaming to latch the hatch. The shoes are mounted upon radially extending pins and are normally spring biased inwardly. When the hatch is adapted to be latched, a conical cam member at the center thereof is rotated so as to force all of the shoes out into their projected latching positions. While such a hatch could be manufactured with less total weight than those hatches previously described, the structure is somewhat complex and subject to malfunction because of the plurality of sliding pin assemblies used. Furthermore, the sealing of this hatch is accomplished by a peripheral seal rather than a face seal, and it can be shown that the effectiveness of the hatch sealing arrangement is reduced with a peripheral sealing arrangement since the seals are more subject to damage than are face seals and require closer tolerances in fitting.

One final prior art two-way pressure hatch which has achieved some measure of commerical success is a hatch which is similar to the last mentioned hatch in that it includes a plurality of circumferentially arranged shoes which are adapted to be rotated outwardly into latching engagement with individual slots in the coaming. The wedge shaped shoes are mounted on pivotable devices which are provided with linkages so that rotation of a center wheel will force the shoes radially outwardly. Because of the relative complexity of the linkages and the nature of the wedging engagements between the hatch and the coaming, this hatch requires additional size and has a degree of design complexity which add considerably to the weight of the hatch.

SUMMARY OF THE INVENTION

In the design of the present invention, it was desired to provide a two-way pressure hatch which would be easy to operate, which would not have any complex mechanisms or the like that would be subject to malfunction to thereby lessen the safety of the hatch, which would be of relatively light weight, and which would have a good positive sealing arrangement. The hatch, as would be expected, must be operable with ease from both the inside and the outside thereof.

It has been found that a face seal, i.e., a seal where one of the members to be sealed is forced by the external pressure directly into engagement with the sealing member, is preferable over a peripheral sealing arrangement wherein the pressure directions are perpendicular to the line of engagement between the faces of the hatch or coaming and the sealing means. In order to provide for the face sealing arrangement, a solid wedge-type engagement must be provided by the latching means so that the seal is maintained in secure sealing relationship when the hatch is closed.

The hatch of the present invention is provided with a split ring which extends about the periphery of the hatch and has two opposed free ends which are arranged for movement toward or away from each other to contract or expand the ring. In the expanded condition of the ring, the ring is adapted to be wedged into engagement with an undersurface of the coaming so that an overlying lip on the hatch will be brought into good sealing engagement with the top surface of the coaming. Expandable means are provided for connecting the free ends of the ring and this expandable means is connected to a member which may be actuated from both within and without the hatch. In the preferred form of the invention the expandable means comprises a toggle joint which is rotated into a locked overcenter position by a rotatable pin extending through the hatch. The pin is provided with actuating handles on both ends thereof.

The aforedescribed hatch of the present invention can be manufactured without unduly increasing the weight over that of a rather basic one-way pressure hatch since the additional latching means required is relatively simple. Yet, the latching means is entirely effective in providing for internal pressure resistance. Furthermore, the latching means is easy to operate and is comprised of only a few basic parts whereby malfunction or damage is virtually eliminated.

BRIEF DESCRIPTION OF THE DRAWINGS

FIG. 1 is a top plan of the hatch of the present invention.

FIG. 2 is a side elevation of the hatch of FIG. 1 with portions thereof being broken away in order to better illustrate certain of its components.

FIG. 3 is an enlarged section taken along the line 3—3 of FIG. 1 and particularly showing the latching mechanism of the hatch.

FIG. 4 is a horizontal section taken along the line 4—4 of FIG. 3 showing the latch in its locked position.

FIG. 5 is a section similar to FIG. 4 but showing the latch in its opened position.

DESCRIPTION OF THE PREFERRED EMBODIMENT

Referring now particularly to FIGS. 1 and 2 of the drawings, it will be seen that the hatch 10 of the present invention comprises a curved body portion 12 which is encompassed by an annular lip 14 and the undersurface 15 of which is adapted to rest upon the top surface 16 of an annular coaming member 18 that defines a hatchway. An O-ring 20 is provided within a groove 21 (see FIG. 3) in the coaming in order to seal the lip 14 against the surface 16 of the coaming.

In order to hingedly mount the hatch 10 to the coaming 18, a pair of blocks 24 are bolted to the top face 16 of the coaming at one side thereof. A pivot pin 26 is secured within each of the blocks so as to project laterally thereof, and a mounting arm 28 is rotatably journalled upon the projecting portion of each pin. The mounting arms are rigidly attached at their distal ends to a plate 30 which projects above and across the body portion 12 of the hatch. The plate 30 is provided with a downturned flange 31 about its periphery and includes projecting triangular portions 30a and 30b which are rigidly secured, at their outer tips, to mounting blocks 32.

Each mounting block is adapted to be received by a clevis 34 which is securely attached to the upper body portion of the hatch at diametrically opposed positions thereon. In order to secure the mounting blocks to the clevis, a pin 36 extends through the upturned arms of the clevis and is secured therein by means of a set screw 37 and a bolt 38 that each extend through longitudinally aligned and threaded passageways in the associated mounting block. When it is desired to adjust the horizontal position of the hatch relative to the coaming in order to provide a better seal or to correct for undue wear, the bolt 38 and set screw 37 may be loosened and the hatch readjusted with respect to the mounting plate 30.

The body portion 12 of the hatch also includes an upstanding tubular projection 40 (FIG. 2) which is internally threaded so as to receive an adjusting bolt 42. The bolt 42 is adjustably fastened to a slide plate 43 which is slidably attached to the underside of the mounting plate 30. The bolt 42 is utilized to adjust the vertical relationship of the hatch with respect to the coaming to compensate for wear and/or damage or the like so that a good sealing relationship is assured between the two members.

External pressures on the hatch will be resisted by the force of the engagement between the lip 14 of the hatch and the face of the coaming which, as previously pointed out, is sealed by the O-ring 20. The latching means and the means for resisting internal pressures is provided by a split ring 50 which extends about almost the entire periphery of the hatch and which is mounted for expansible movement within an annular slot 52 on the peripheral face of the hatch below the radially extending lip 14. The split ring, and particularly the means for expanding or contracting the same, as shown in detail in FIGS. 3, 4 and 5. As shown in FIGS. 4 and 5, the free ends 50a and 50b of the ring are each provided with an inwardly projecting ear 54 to which there is pivotally mounted a link 56. The links 56 are, in turn, pivotally connected to a crank member 58 so as to form an expandable toggle joint connection 60 between the free ends of the split ring.

In order to rotate the crank 58 and to thereby expand or contract the toggle joint connection, the crank is rigidly secured to the hub 61 of a pivot pin 62 which extends vertically through the body portion of the hatch adjacent the other periphery thereof. The pivot pin 62 is rotatably mounted within a pair of outwardly and inwardly projecting tubular portions 64 and 64a, respectively, of the hatch body and is sealed therein by means of O-rings 65 provided in circumferential grooves within the tubular projecting portions (FIG. 3). A handle 67 is secured to the upper end of the pivot pin and a handle 68 is secured to the lower end thereof so that the pin can be rotated in order to actuate the toggle joint.

It will be noted that the upper surface of the split ring at the outer end thereof is provided with a beveled edge portion 70. When the ring is expanded, the edge 70 is adapted to mate with an inclined edge surface on the undersurface of the coaming 18 so that good pressure engagement in both directions is provided between the hatch and the coaming.

The operation of the latching mechanism can be illustrated by the two views of this mechanism shown in FIGS. 4 and 5. In the unlatched, or open, position of the toggle joint 60 (as shown in FIG. 5) the crank 58 is rotated so that the projecting ears 54 of the split ring move together until the ends 50a and 50b thereof are urged into engagement. In this position, the ring will be entirely retracted within the slot 52 in the hatch, and the hatch may be readily lifted, either from within or without, by rotating it about the axis of the hinge pins 26. When either the handle 67 or 68 is rotated so as to rotate the crank 58, the links 56 are pivoted until they are in an overcenter position whereby the natural resilient contracting force of the ring acts so as to maintain the ring in its expanded position. As shown in FIG. 4, this occurs when the links are placed in an overcenter position, i.e., when the pivotal connection of the link with the crank has been moved past the position defined by the line (shown in phantom lines in FIG. 4) between the pivot pin axis and the axis of the pivotal connection of the ear 54 with the link. At this time the ring will be expanded so that the beveled edge 70 will seat against the undersurface of the coaming to assure good pressure engagement therebetween. Rotation of the handles 68 and 67 will permit the ring to be contracted and the hatch to be opened as explained hereinbefore.

It will be seen that the hatch of the present invention is relatively simple with a minimum of moving parts and that it can be constructed as a relatively light weight hatch structure even though good pressure resisting engagement is provided for against pressures acting both internally and externally of the hatch. In this regard it should be noted that internal pressure is resisted by engagement of the ring 50 with the coaming 18 throughout substantially the entire 360 degrees of the hatch. Furthermore, it will be seen that a relatively easy-to-operate toggle joint connection is provided between the split ends of the ring so as to effect the latching movement. This structure contains no complex or delicate mechanisms and, therefore, is not easily subject to malfunction or damage in the ordinary course of events. Thus, the hatch is easily operated without requiring undue force and should provide a safe egress and ingress to the vessel upon which it is mounted.

Although the best mode contemplated for carrying out the present invention has been herein shown and described, it will be apparent that modification and variation may be made without departing from what is regarded to be the subject matter of the invention.

What is claimed is:

1. A hatch capable of withstanding both external and internal pressures comprising a body portion having a circumferential lip arranged to be received in sealing engagement with an upper circumferential surface of a coaming member, said body portion being provided with a peripheral groove facing said coaming member, a split ring member mounted within said groove and having two free ends arranged for movement toward or away from each other to respectively contract or expand said ring member, a toggle joint for connecting said free ends of the ring member, a rotatable pin connected to said toggle joint and arranged to rotate said toggle joint into a locked overcenter position for causing said ring member to expand into a position beneath a lip on said coaming member and into snug latching engagement with said coaming member, said pin extending transversely to the plane of said ring member through said body portion of the hatch, means for journaling said pin in said body portion of the hatch for rotation about its longitudinal axis, and means provided on each end of said pin for rotating the pin so that said hatch can be locked and unlocked from either side thereof.

2. A hatch according to claim 1 wherein said connecting means comprises a pair of links, each of said links being pivotally attached at one end there-of to one of the free ends of said ring member, and a crank attached to and mounted for pivotal movement about the pivot axis of said pin, said crank being pivotally connected to the other ends of each of said links at spaced positions on said crank whereby said links and crank form a toggle joint connection between said free ends of the ring member which is arranged to be placed in a locked overcenter position to expand the ring member by rotation of said crank about said pivot axis.

3. A hatch assembly comprising a coaming surrounding a hatch opening, said coaming having a flat upper surface and a lower surface, a hatch arranged to close and seal said hatch opening, means for hingedly mounting said hatch to said coaming, said hatch being provided with a circumferential lip having a flat lower surface arranged for mating engagement with the flat upper surface of said coaming when said hatch is closed, means for sealing between said lip of the hatch and said coaming, a split ring mounted upon said hatch and extending about the periphery thereof adjacent to said lip, means for retaining said ring upon said hatch and for guiding said ring for radial expansive movement, said ring having two free ends arranged for movement toward or away from each other to respectively contract or expand said ring, said ring having an upper surface arranged for mating engagement with said lower surface of said coaming when said ring is in its expanded condition, means for connecting the free ends of the ring, means for expanding the effective length of said connecting means for causing said ring to expand whereby said upper surface of said ring and said lower surface of said coaming are placed in snug mating engagement, said last-named means comprising a rotatable member which extends transversely to the plane of said ring through the body of said hatch, means for journaling said member in said body of said hatch for rotation about its longitudinal axis, and means provided on each end of said member for permitting rotation of said member so that said hatch can be locked and unlocked from either side thereof.

4. A hatch assembly according to claim 3 wherein said lower surface of said coaming and said upper surface of said ring are flat surfaces which are inclined with respect to the flat upper surface of the coaming and the flat lower surface of the lip of the hatch.

5. A hatch assembly according to claim 4 wherein said means for sealing between said lip of the hatch and said coaming comprises an annular resilient sealing element mounted in an annular groove extending about the periphery of the coaming in said flat upper surface thereof.

6. A hatch assembly according to claim 5 wherein said hatch is provided with a peripheral groove for receiving said ring when it is in its contracted condition.

7. A hatch assembly according to claim 5 including means for adjusting both the vertical and horizontal position of the hatch with respect to said coaming.

8. A hatch assembly according to claim 4 wherein said means for connecting the free ends of the ring comprises a toggle joint including a crank and said rotatable member comprises a pin connected to said crank of said toggle joint which pin is adapted to be rotated about a fixed pivot axis coinciding with the longitudinal axis of the pin to move said toggle joint into a locked overcenter position.

* * * * *